Figure 7:
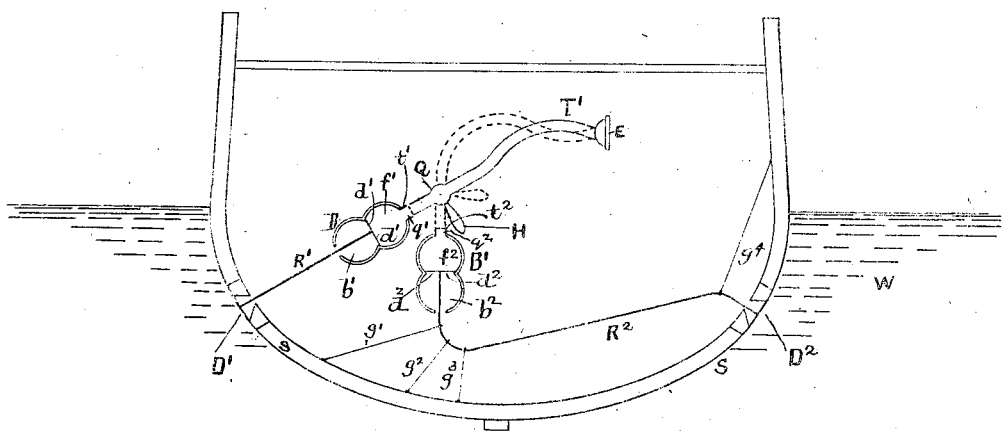

No. 798,202. PATENTED AUG. 29, 1905.
J. B. MILLET, E. C. WOOD & H. B. GALE.
SOUND RECEIVING MEANS FOR SUBMARINE SIGNALING.
APPLICATION FILED NOV. 21, 1903.
4 SHEETS—SHEET 1.
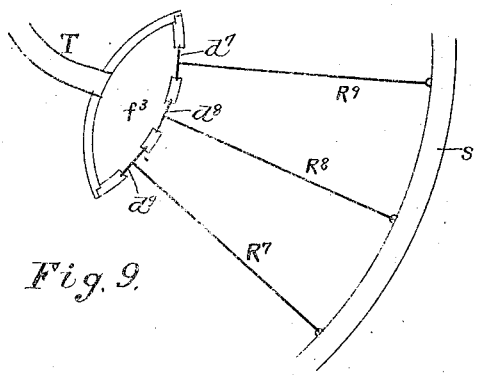
Fig. 9.
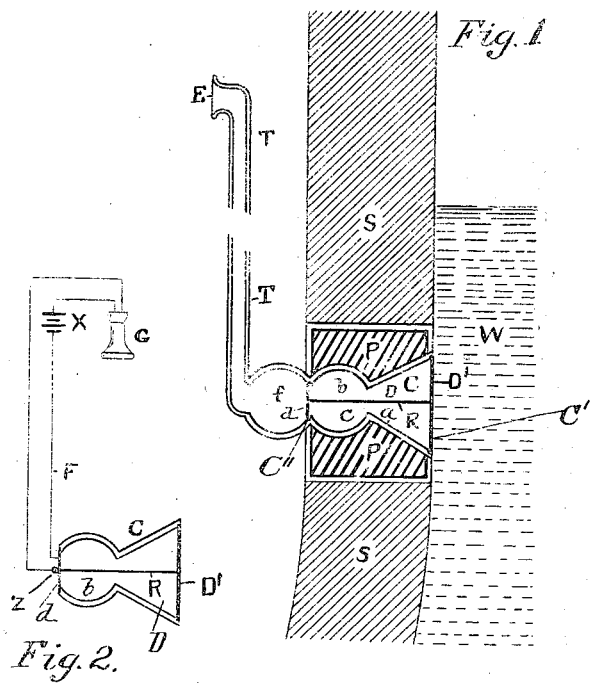

No. 798,202. PATENTED AUG. 29, 1905.
J. B. MILLET, E. C. WOOD & H. B. GALE.
SOUND RECEIVING MEANS FOR SUBMARINE SIGNALING.
APPLICATION FILED NOV. 21, 1903.
4 SHEETS—SHEET 2.
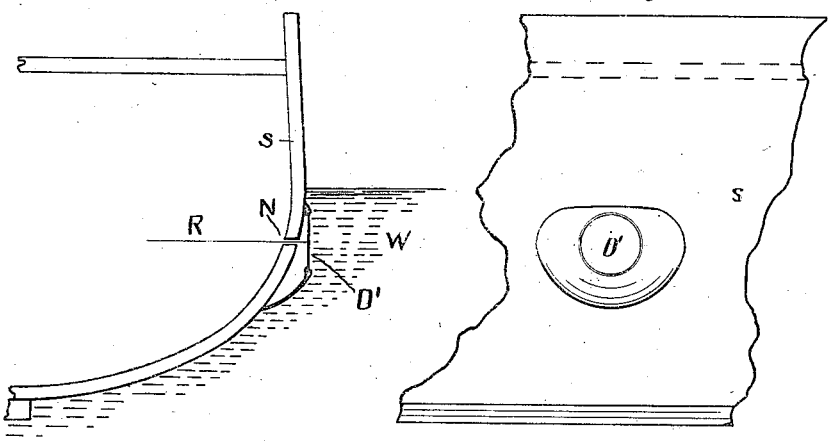
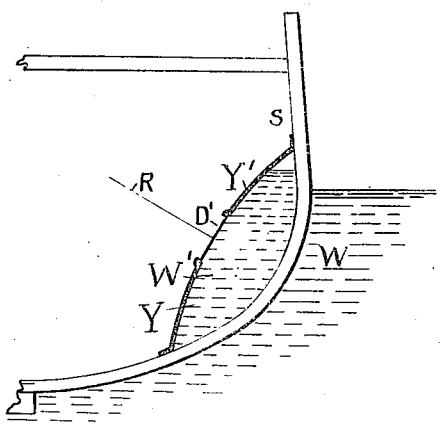
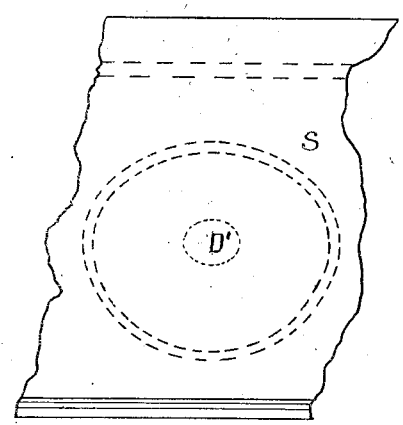
Witnesses.
Inventors
Attorneys.

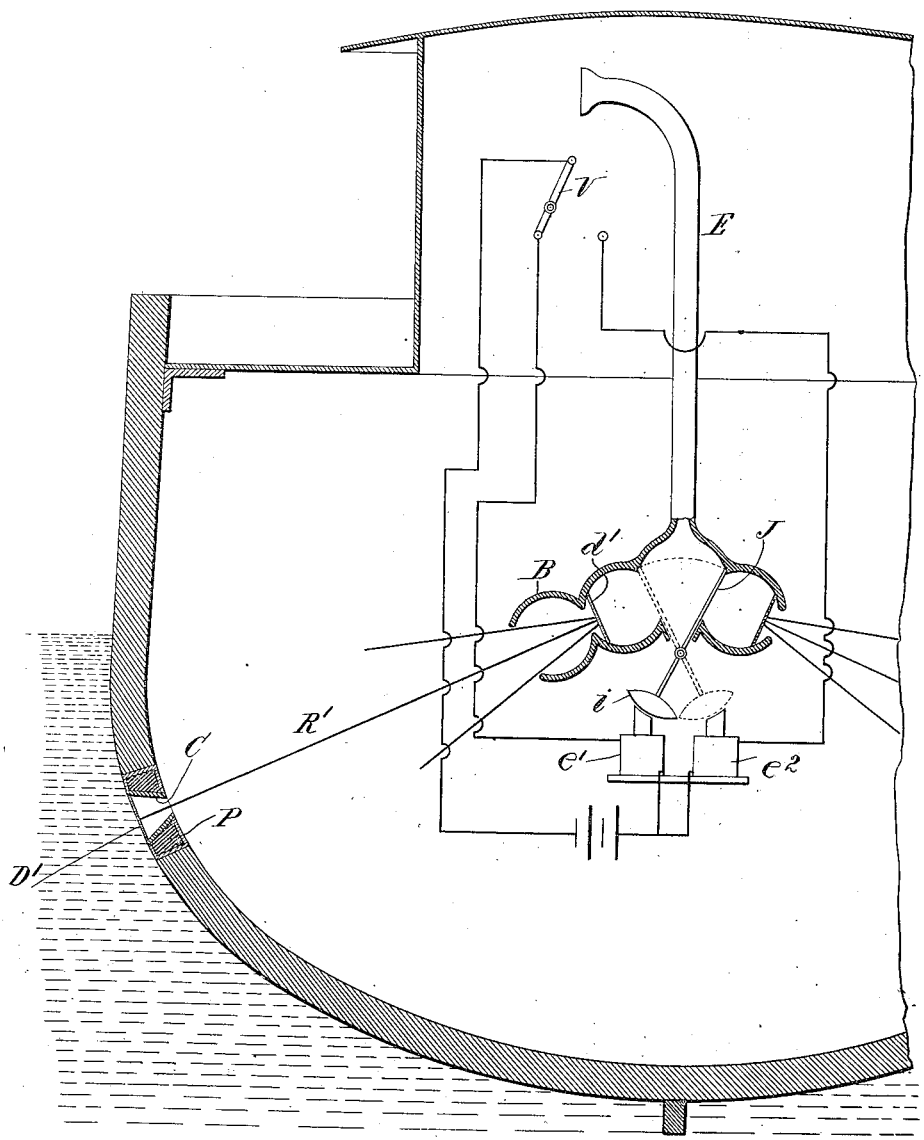

UNITED STATES PATENT OFFICE.

JOSIAH B. MILLET, OF BOSTON, EDWARD C. WOOD, OF SOMERVILLE, AND HORACE B. GALE, OF NATICK, MASSACHUSETTS, ASSIGNORS TO SUBMARINE SIGNAL COMPANY OF WATERVILLE, MAINE, OF BOSTON, MASSACHUSETTS, A CORPORATION OF MAINE.

SOUND-RECEIVING MEANS FOR SUBMARINE SIGNALING.

No. 798,202.  Specification of Letters Patent.  Patented Aug. 29, 1905.

Application filed November 21, 1903. Serial No. 182,134.

*To all whom it may concern:*

Be it known that we, JOSIAH B. MILLET, residing at Boston, EDWARD C. WOOD, residing at Somerville, and HORACE B. GALE, residing at Natick, in the Commonwealth of Massachusetts, citizens of the United States, have invented certain new and useful Improvements in Sound-Receiving Means for Submarine Signaling; and we do hereby declare the following, when read in connection with the accompanying drawings, to be a full, clear, and exact disclosure of our invention.

All means heretofore known for receiving sound-signals from the water are open to the objection that they readily respond to sounds emanating at the receiving-station, whereby the incoming signals are confused and rendered unintelligible. This is particularly so on shipboard, where noises caused by engines, pumps, and other machinery and by the dashing of the water against the sides of the ship at times completely drown all signals except those from the most powerful sending apparatus. We have discovered that the sound-vibrations caused by these local disturbances travel through the walls or sides of the ship or other structure in the plane of their length and that there is little or no sound-vibration in any other plane. The sound waves or vibration from the signaling-station, on the contrary, strike and traverse the walls of the structure at an angle thereto.

The object of our invention is to devise a sound-receiving means responsive to the impinging sound-waves from a signaling-station and unresponsive to all sounds passing along the walls of the supporting structure.

Another object of our invention is a means of locating and using our improved receivers singly or in groups to determine with great accuracy the line of direction of incoming signals.

With these and other objects in view our invention comprises primarily a wave-receiving diaphragm, so mounted in the ship or receiving-station as to receive the incoming sound-waves and to be vibrated thereby, preferably in contact with the water, although not necessarily with the open-sea water, as will presently be shown.

Our invention comprises also receiving means which in some instances may act as resonating or intensifying means. Such means may be located at any convenient point, which may be in the immediate neighborhood of the receiving-diaphragm on or near the side of the ship or may be at a distance therefrom and at a point in the interior of the structure. As an element of the receiving means is another diaphragm, which for convenience we may call a "secondary" diaphragm. This secondary diaphragm is not necessarily of the size of the primary receiving-diaphragm, but preferably and usually much smaller. The two diaphragms are connected, preferably, from their central points by a good sound-conductor, the material of which is not important, but which depends to some extent upon circumstances—such, for instance, as the relative positions of the connected diaphragms. The conductor is relatively long and thin and extends tautly or comparatively rigidly between the two diaphragms. This vibratory connection, which may be a wire, rod, or cord, or the like, is very sensitive to vibrations the direction of which is along its axis, but is not sensitive to cross-vibrations. It will therefore receive from the primary diaphragm, against which the sound-waves impinge, only vibrations in the direction of its length and will deliver to and effectively operate the diaphragm of the receiving means through such vibrations only. In other words, the conductor will not receive and deliver to the last-named or so-called "secondary" diaphragm any of the vibrations ordinarily created by local disturbing agencies. By locating the receiving means at a point well within the ship or other structure and by making the sound-conductor between the diaphragms relatively long several of the primary receiving-surfaces may be connected to a single secondary receiving-diaphragm or to a set of said diaphragms conveniently located, whereupon by means of a switching or selecting mechanism any receiving-surface can be readily connected to the operator to enable him to determine by relative intensity of action from which direction the sound emanates.

Having briefly set forth the objects of our invention, we will now specifically describe our apparatus for operatively carrying out the same, reference being had to the accompanying drawings, in which—

Figure 8:
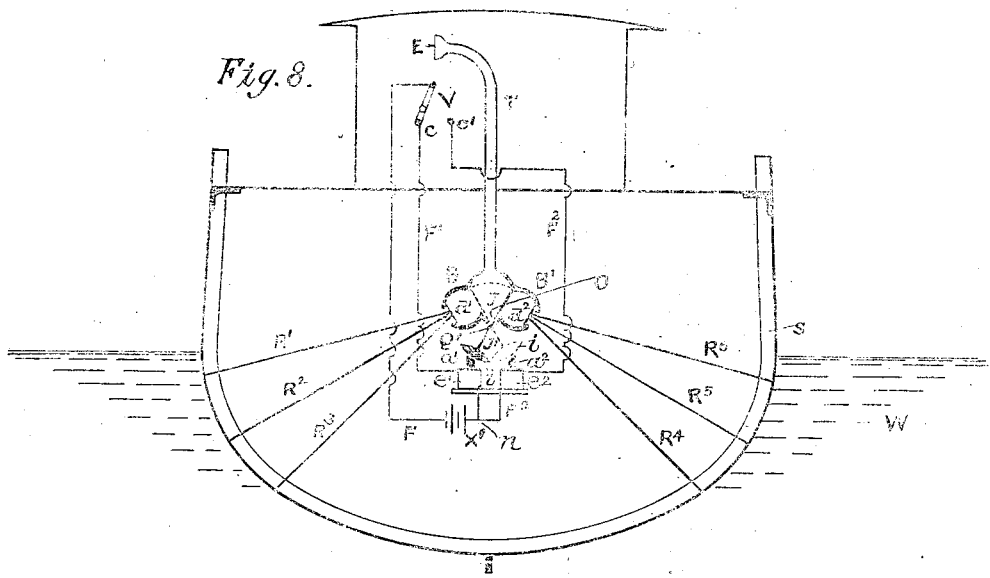

Figure 1 is a vertical sectional view of one form of the device. Fig. 2 indicates in diagram a modification of the device shown in Fig. 1. Figs. 3 and 4 are modifications of our sound-receiving means in sectional elevation. Figs. 5 and 6 are front elevations of the receiving means shown in Figs. 3 and 4, respectively. Figs. 7 and 8 are modified arrangements of receiving means, showing also our means for determining directions. Fig. 9 shows in sectional elevation still another modification of our device, Fig. 10 shows in sectional elevation still another modification of our invention.

Referring to Fig. 1, the wall of the ship or other structure is shown at S. In an opening in the wall is shown a hollow casing C, provided with openings C' and C'' at either end, the whole forming a chamber D. At the outer end of the chamber D and in the opening C' is mounted a primary receiving-diaphragm D', and at the inner end of said chamber and in the opening C'' is mounted the diaphragm $d$ of the receiving means. Connecting these diaphragms is a connecting-conductor R, which may be a tension-wire, a rod, or taut cord of any suitable material. Around the casing C we have shown a packing P, preferably porous and of sound-absorbing or non-conducting material, whereby sound-vibrations traversing the wall S and the casing C are prevented from reaching the chamber D. The chamber D we have shown as preferably constructed with an outwardly-flaring portion $a$, joining, through a neck $c$, a resonating portion $b$. We have shown the chamber D as extended inwardly beyond the inside wall of the ship and beyond the diaphragm $d$, and we have shown such extension in the form of a resonating-chamber $f$. This chamber $f$ is shown in connection with a sound-conducting tube T, having an earpiece E for the operator. The horizontal vibrations of the diaphragm D' are delivered, by means of the connection R, to the diaphragm $d$ and from the resonating-chamber $f$, through the tube T, to the operator.

In Fig. 2 we have shown the adaptation of electrical transmitting means to our invention. In this instance the resonating-chamber $f$ of Fig. 1 is shown to be omitted and in its stead there is shown in connection with the diaphragm $d$ the electrical resistance-varying means Z of any suitable character. This means Z is shown connected by wires F with the battery X and the electrical receiver G to be used by the operator. It is apparent that the medium through which the ear of the operator is put into connection with the diaphragm $d$ is not important.

Although in Figs. 1 and 2 we have shown the diaphragm D' as mounted immediately within the wall of the ship, we may prefer to mount it in a special casing attached to the outside of the ship, as shown in Figs. 3 and 5. In this instance the receiving means may be located as before or within the ship, as hereinafter described, and will be joined to the diaphragm D' of the casing by the connection R through a hole N in the wall of the structure. Again, whereas in Figs. 1, 2, 3, and 5 we have shown the diaphragm D' in direct contact with the sea-water we may prefer to mount it in the wall of an interior water-tank and in contact with the tank-water. In this instance, however, the water of the tank is in contact with the inside wall of the ship in order that there may be substantially a continuity of the water-conducting medium from the source of sound to the diaphragm D' and that no loss of energy may be sustained in passing from one medium to another. In Figs. 4 and 6 we have shown such an inside tank at Y, having a wall Y' in which is mounted the diaphragm D'. The tank is shown as filled with water W' above the level of the diaphragm. The diaphragm connection is shown at R. The receiving means is not shown, but may be of any type mentioned herein.

Coming now to our means for mounting the receiving means within the ship, and particularly to our means for arranging the operator's connection for the determination of direction and turning to Fig. 7, the diaphragms D' D² are shown mounted within the walls of the ship and flush with the side thereof. Fig. 7 also shows a construction in which connections R' R² of the character hereinbefore described connect the diaphragms D' D² to the diaphragms $d'$ $d^2$. Moreover, it is not necessary that the connections shall be direct. The connection R², for example, in Fig. 7 is curved and braced by guys $g'$, $g^2$, $g^3$, and $g^4$, so as to be kept in place without interfering with its utility as a conductor of sound. The receiving means B B' may be of any desired form, but are here shown as double resonating-chambers $b'$ $f'$ and $b^2$ $f^2$, separated by the diaphragms $d'$ and $d^2$, respectively. The chambers $f'$ and $f^2$ have openings $q'$ and $q^2$, provided, preferably, with tubular extensions $t'$ and $t^2$. At the point Q is the operator's tube T, shown as pivoted and adapted to be swung on its pivot by the handle H. This tube is provided beyond its pivotal point with a tubular extension T', adapted to register with the openings $q'$ $q^2$ or the tubes $t'$ and $t^2$. When the tube T is in the position indicated by the full lines, the operator is in connection with the receiver B and through the connection R' with the diaphragm D', whereby he is enabled to detect noises and receive signals coming from that side of the ship. Upon swinging up the handle H, however, the tube T is thrown out of connection with the means B and into connection with the means B', as indicated by the dotted lines. The operator is then in connection with other portions of the ship. By shifting the handle and noting the relative intensity of sound effects the direction of the sound may be readily determined.

In Fig. 8 is indicated the use of the side of the ship as the primary sound-receiving diaphragm. We have also shown in Fig. 8 a form of switching device in the receiving means differing somewhat from that shown in Fig. 7. Of course the switching devices of these two figures may be used with any arrangement of primary diaphragms herein disclosed. In the structure shown in Fig. 8 the tube T is permanently connected with both chambers B B' instead of being movable with relation thereto, as in Fig. 7. In this instance, however, means comprising a shutter (shown at J) is provided for intercepting at will the sound-waves on their passage from either B or B' to the tube T. The shutter is shown as pivoted at Q' outside the chamber B B', but entering said chamber through an opening O in the bottom thereof. The movement of the shutter is electrically controlled from a switch V near the operator's earpiece. The fixed contact of the switch is in circuit through line F with battery X' to the point $n$. From this point the circuit continues in multiple branches F' F$^2$ to the switch-contacts $c$ $c'$, respectively. In each of the branch circuits F' F$^2$ is an electromagnet. These magnets are shown at $e'$ $e^2$ and are shown as located immediately below the casing B' B$^2$. The shutter J is provided with an extension J', carrying a piece of metal $i$, which acts as an armature common to the magnets $e'$ $e^2$. When the movable terminal of the switch V rests on the contact $c$, the circuit is established through the magnet $e'$, energizing the same and causing it to draw the armature $i$ to the position shown in the full lines. This movement of the armature to the left causes the shutter to move to the right and to intercept and cut off all sounds passing through B' from the diaphragm $d^2$ and its connections. Upon throwing the switch to the contact $c'$ the armature and shutter are swung in the reverse direction, and sounds passing through B from the diaphragm $d'$ and its connections are then intercepted. The diaphragms $d'$ and $d^2$ are shown in Fig. 8 as each connected by a plurality of connections with several parts of the ship's side. The connections to the diaphragm $d'$ are shown at R' R$^2$ R$^3$ and those to the diaphragm $d^2$ at R$^4$, R$^5$, and R$^6$. In each of these groups the connections are in multiple and the effect on the diaphragms $d'$ $d^2$ will thus be the combined action of the group to which they are each connected. By moving the switch V to the right or the left while retaining the ear against the earpiece E the operator readily determines the general direction of the sound.

It is of course apparent that electrical sound-transmitting means—such, for instance, as shown in Fig. 2—may be substituted for the tubular sound-transmitter of Figs. 7 and 8. Such a modification could be made by any one skilled in the art after reading the above description. It would simply be necessary, for instance, in order to connect the operator's instrument with either of the receivers B B' that an electrical switch be substituted in Fig. 7 for the pivoted tube $t'$ and in Fig. 8 for the shutter J.

In Fig. 9 we have shown a single resonating-chamber $f^3$ with a plurality of diaphragms $d^7$ $d^8$ $d^9$. Each of these diaphragms is suitably joined by a connection R$^7$, R$^8$, or R$^9$ with a primary receiving-diaphragm. The primary diaphragm may be a portion of the side of the ship or may be of any of the forms heretofore described. The resonance-chamber is suitably connected with the operator's ear-piece.

Fig. 10 shows the receiver of Fig. 8 connected to a primary receiving-diaphragm, mounted as shown in Fig. 1.

It is apparent that changes may be made in much of the apparatus described and that features may be added thereto and others omitted without affecting the true scope of our invention.

Having thus fully described our invention, we claim and desire to secure by Letters Patent of the United States—

1. As a sound-receiving means, in combination with the side of a ship or other structure in contact with the water, sound-receiving means and a vibratory connection between such receiving means and the side of the structure.

2. As a sound-receiving means, in combination with the side of a ship or other structure in contact with the water, a vibratory diaphragm and a vibratory connection between such diaphragm and the side of the structure.

3. In an apparatus for receiving sound-signals transmitted through water, the combination with a ship of a wire attached at one end to the sides thereof below the water-line and at the other end to a sound-receiving diaphragm whereby sounds received from the water are transmitted through the wire to the sound-receiving diaphragm and sounds originating in the ship are not transmitted to the receiving-diaphragm.

4. In an apparatus for receiving sound-signals transmitted through water, the combination of a ship, a hollow case penetrating the side thereof, a diaphragm closing the outer end of the case in contact with the water, a sound-receiving diaphragm on the inside of the ship, and a vibratory connection between the diaphragms, substantially as set forth and for the purposes described.

5. In an apparatus for receiving sound-signals transmitted through water, the combination with a ship or similar floating structure of sound-transmitting diaphragms in contact with the water upon opposite sides of the ship, sound-receiving diaphragms inside the ship, and vibratory connections between the transmitting-diaphragms and the receiving-diaphragms, respectively.

6. In an apparatus for receiving sound-signals transmitted through water, the combination with a ship or similar floating structure of sound-transmitting diaphragms in contact with the water upon opposite sides of the ship, sound-receiving diaphragms inside the ship, sound-transmitting wires connecting the transmitting-diaphragms with the receiving-diaphragms, respectively, and operator's indicating instrument and means for placing either one of the sound-receiving diaphragms in connection with the operator's instrument, substantially as set forth.

7. In an apparatus for receiving sound-signals transmitted through water, the combination of a ship or other floating structure, a sound-receiving diaphragm on the inside of the structure, and wires connecting the sound-receiving diaphragm with different points on the sides of the ship in contact with the water, substantially as and for the purposes described.

8. In an apparatus for receiving sound-signals transmitted through water, the combination of a ship or similar floating structure, sound-receiving diaphragms inside the structure, wires connecting one of the diaphragms with different points on one side of the ship in contact with the water, and other wires connecting the other receiving-diaphragm with different points on the other side of the ship in contact with the water, substantially as and for the purposes described.

9. As a sound-receiving means, in combination with the side of a ship or other structure, sound-receiving means and a vibratory connection between such receiving means and the side of the structure.

10. In combination with the wall of a ship or other structure supporting the same, a diaphragm so situated on said wall as not to be effectively vibrated in the plane of its axis by vibrations traversing the wall, vibratory connection to the surface of said diaphragm out of contact with said wall, sound-receiving means to which the other end of said connection is attached.

11. In combination with the wall of a ship or other structure, having an opening therein, a diaphragm closing the opening, sound-receiving means within the structure and a vibratory connection between the surface of the diaphragm and the receiving means.

12. In combination with the wall of a ship or other structure, having an opening therein, a hollow casing in said opening, a diaphragm closing the opening, sound-receiving means within the structure and a vibratory connection between the surface of the diaphragm and the receiving means.

13. In combination with the wall of a ship or other structure, having an opening therein, a hollow casing in said opening, sound-absorbing or non-conducting material between said casing and the sides of the opening, a diaphragm closing the opening, sound-receiving means within the structure and a vibratory connection between the surface of the diaphragm and the receiving means.

14. In combination with the side of a ship or other structure, a casing mounted on the outside thereof below the water-line, a diaphragm in or forming part of the wall thereof in contact with the water, sound-receiving means within the ship, a vibratory connection from the surface of said diaphragm, extending through an opening in the side of the ship and attached within the same to said receiving means.

15. In combination with a plurality of diaphragms in or forming part of the wall of a ship or other structure, sound-receiving means within said structure in operative connection with the operator's receiver, said receiving means containing diaphragms, vibratory connections between the surfaces of said plurality of diaphragms in the wall of the structure and the diaphragms of the receiving means.

16. In combination with a plurality of diaphragms in or forming part of the wall of a ship or other structure, sound-receiving means within said structure in operative connection with the operator's receiver, said receiving means containing diaphragms, vibratory connections between each of the surfaces of said plurality of diaphragms in the wall of the structure and one of the diaphragms of the receiving means.

17. As a means for determining the direction of incoming sounds, a plurality of diaphragms in or forming part of the wall of a ship or other structure, a plurality of receiving means within said structure, vibratory connections between the surfaces of the aforesaid diaphragms and said receiving means, operator's receiving apparatus, and means for connecting at will said receiving apparatus with any of the said receiving means.

18. As a means for determining the direction of incoming sounds, a plurality of diaphragms in or forming part of the wall of a ship or other structure, a plurality of vibratory diaphragms within said structure, vibratory connections between the surfaces of the diaphragms within the structure and those in the walls of the same, and operator's receiving means adapted to be placed at will in operative relation to any of said diaphragms within the structure.

19. As a means for determining the direction of sound, two or more vibratory sections or diaphragms in the side of a ship or other structure, a multiple sound-receiving means, operator's receiving or indicating means in permanent connection with said multiple means, sound-conducting connections between said multiple means and aforesaid diaphragms, intercepting or selecting means under the control of the operator for determining from which section of said multiple means the sounds shall be received by the operator.

20. As a means for determining the direction of sound, two or more vibratory sections or diaphragms in the side of a ship or other structure, a multiple sound-receiving means, operator's receiving or indicating means in permanent connection with said multiple means, sound-conducting connections between said multiple means and aforesaid diaphragms and intercepting or selecting means under the control of the operator comprising an electromagnetically-operated shutter or sound-shield for determining from which section of said multiple means the sounds shall be received by the operator.

21. As a means for determining the direction of sound, a multiple chamber composed of several sections, a tube extending from a point common to all of said sections to the operator's receiving or indicating means, a shutter under the control of the operator for determining from which sections the sounds shall enter the tube.

22. As a means for determining the direction of sound, a multiple device composed of several sound-receiving sections, operator's receiving or indicating means connected to said device at a point common to all its sections, and means under the control of the operator for cutting any of said sections out of operative relation to his receiving or indicating means.

23. As a sound-receiving means, a tubular chamber or casing adapted to be mounted on a supporting-wall, the same comprising an outwardly-flaring end, a double resonance-chamber and an ear-tube, a diaphragm across the flaring end of said casing and a diaphragm across the resonance-chamber between its sections and a taut cord or rod attached at one end to each diaphragm.

JOSIAH B. MILLET.
EDWARD C. WOOD.
HORACE B. GALE.

In presence of—
ANNIE J. CONVERSE,
JOHN E. R. HAYES.